Sept. 7, 1965

E. E. EDDEY 3,205,358

DENSITOMETER AND ASSOCIATED AMPLIFICATION
CIRCUITRY TO CONTROL THE DENSITY
OF FLOWING MATERIALS

Filed May 25, 1962

*INVENTOR.*
EVERETT E. EDDEY

BY

ATTORNEY

United States Patent Office 3,205,358
Patented Sept. 7, 1965

3,205,358
DENSITOMETER AND ASSOCIATED AMPLIFICATION CIRCUITRY TO CONTROL THE DENSITY OF FLOWING MATERIALS
Everett E. Eddey, Akron, Ohio, assignor to Goodyear Aerospace Corporation, Akron, Ohio, a corporation of Delaware
Filed May 25, 1962, Ser. No. 197,753
6 Claims. (Cl. 250—83.3)

The present invention relates to a density measuring instrument and, more particularly, to a gamma-ray densitometer and amplifier circuit therefor capable of generating error voltages used to change the flow of materials to the densitometer so as to insure a selected density.

Density instruments using gamma-ray transmission methods are in wide industrial use. These methods utilize a gamma-ray source and a detector coupled with an indicator circuit. Sheets of metal, plastics, paper, cloth, or process liquids pass continuously between the source and the detector. The indicator circuit announces the presence of defects in the material and/or the density thereof.

Gamma-ray densitometers have the inherent problems of sensitivity, frequency of adjustments, and statistical noise. The sensitivity increases linearly with increase in source intensity. Gamma-ray attenuation resulting from the several different absorbing medii as conduit wall and material in the conduit between the source and the detector is a factor which alters the linear relationship between sensitivity and intensity. The parameters of the gamma-ray densitometer must be chosen so as to maximize the change in received radiation intensity for a given change in the density of the processed material.

Frequent adjustments are required to compensate for the decay of the radioactive isotope source. A change in the intensity of the radioactive source affects both the steady-state and variable components of the detector current. A change in steady-state component will result in an apparent change in the density of the material being measured. The densitometer amplifier must be periodically adjusted to compensate for the changes in the source intensity to keep the instrument in a fixed calibration. The decrease in the source intensity affects the variable component of the detector current to change the sensitivity of the instrument. The sensitivity is reduced with a decrease in source intensity.

The statistical properties of the radioactive decay result in a fluctuation in the detector current. Only a small number of the rays emitted by the source are actually sensed by the detector because radiation occurs in all directions and about 80% of the radiation is absorbed in the passage from the source to the detector.

Densitometer amplifier circuits have been proposed to mitigate the critical gamma-ray densitometer characteristics. These circiuts have disadvantages of being excessively sensitive to changes in input reference resistors and reference bias output. The input reference resistor is a high megohm resistor which does not possess extreme stability. These circuits include unavoidable leakage resistors which have a tendency to produce excessive leakage to ground. This leakage, which can exist anywhere from the detector output to the input of the amplifier, will produce a change in the circuit output which will affect the density reading of the instrument. The circuits furthermore include amplifiers which are not drift stabilized and have grid current changes which will produce a change in the amplifier output which is not predicated upon the density of the material passing between the detector and the source.

It is the general object of the invention to avoid and overcome the foregoing and other difficulties of and objections to prior art practices by the provision of a simplified and relatively inexpensive amplifier circuit which has performance characteristics of sensitivity, linearity, accuracy and substantially no drift.

Another object of the invention is to provide an apparatus for accurately and automatically controlling and/or measuring the density of flowing materials.

Another object of the invention is to provide a circuit which will balance out the steady-state current of an ionization chamber or other low current high impedance source, by a method which does not depend primarily on the stability of high megohm resistors.

Another object of the invention is to provide a circuit for compensating for the decay in intensity of the radioisotope source used in a radiation type densitometer.

Another object of the invention is to provide a radioisotope decay compensating circuit with an input connection for an auxiliary input to compensate for other adverse conditions.

According to the invention, a radioactive source and a radio-activity detection means are positioned relative to each other to measure the density of process material moving between the source and the detector. The detector is responsive to radiation to produce a low current output. A detector amplifier circuit is employed to balance out the steady-state current of the detector. This circuit contains a component which produces a low constant reference current output which is substantially of the same order of magnitude as the steady-state current of the detector. A high gain amplifier augments the variable signal component of the detector output. The amplifier output regulates a control to vary the density of the process material. A feedback circuit shunts the amplifier to send the amplifier output back to the amplifier input. This feedback circuit includes a first resistor in series with a second high megohm resistor. An adjustable bias is connected to the feedback circuit between the resistors to control the circuit output in accordance with the decay of the radioactive source. The feedback circuit contains an input connection for an auxiliary input to compensate for other adverse conditions.

The exact nature of this invention as well as other objects and advantages thereof will be apparent from the consideration of the following specification in relation to the annexed drawing in which.

Figure 1:
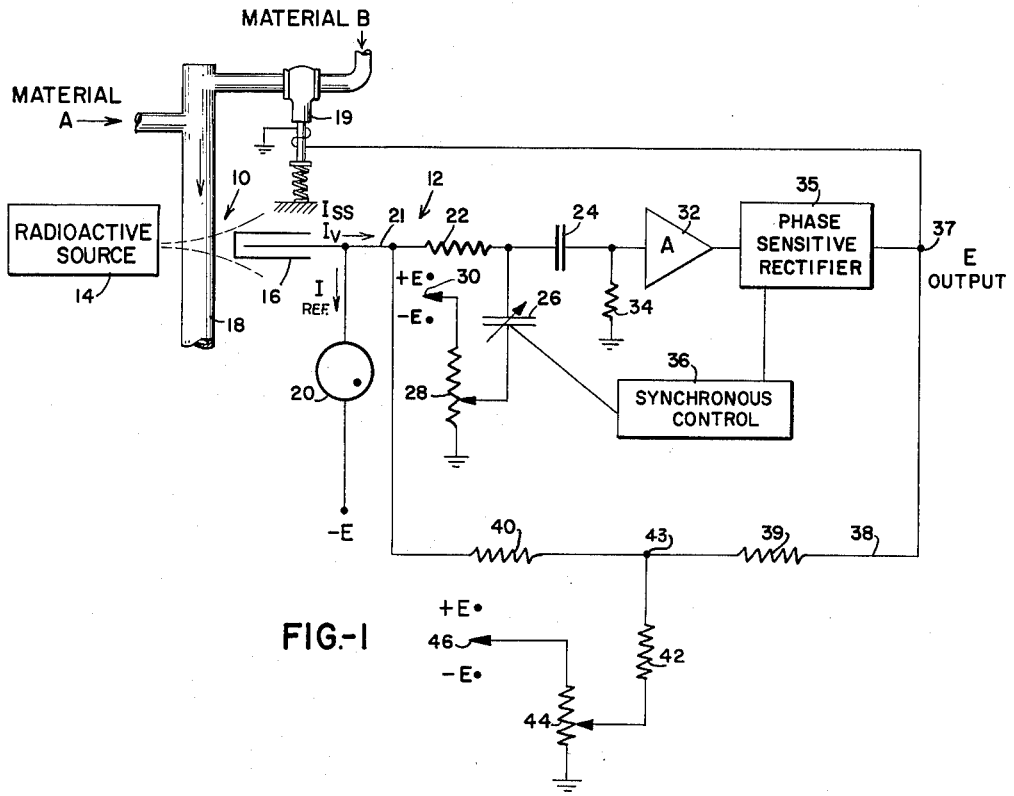
FIG. 1 is a diagrammatic view of a densitometer and schematic of the level adjusting and amplification circuit therefor.

Referring to the drawing, there is shown in FIG. 1 a gamma-ray densitometer 10 conductively coupled to a level adjusting and amplification circuit 12. The circuit 12 balances out the steady-state current and amplifies the variable current from the densitometer, and compensates for the decay in intensity of the radioisotope source.

The densitometer includes a radioactive source 14. The source is partially shielded and is derived from an extremely compact and strong gamma-ray radiating material such as cobalt 60 or cesium 137. A radioactivity detector 16, such as an ionization chamber, is responsive to the gamma rays to produce a low current output. This current consists of two parts, a steady-state component and a variable component. A process control conduit 18 is positioned between the radio-active source and the radioactivity detector. The conduit directs process materials which have varying degrees of density through the path of gamma rays. The intensity of the gamma-ray radiation which penetrates the conduit and material therein and is detected by the ionization chamber is a function of the density of the process fluid.

The detector output is controlled and amplified by the circuit 12 to produce an output signal $E_0$ which operates a process control such as a spring biased solenoid control valve 19 to either increase or decrease the density of the mixture of materials. The valve 19 regulates the quantity of material B that is mixed with material A in the process conduit 18. The sensitivity, accuracy, and linearity of the circuit determine the accuracy of the density control of the fluid materials in the process conduit 18.

The level adjusting and amplification circuit 12 includes a low reference current tube 20 connected to the conductor 21 leading from the detector 16. The reference tube 20 is a nitrogen or other gas filled tube which is radiation energized and has a fixed current output, such as tube CH1027–10 mad by Tung-Sol Electric Company under the trademark "Curpistor." The current output of the tube 20 is of the same order of magnitude as the steady-state value of the current from the detector 16. A negative bias $-E$ is applied to the tube 20. The bias on tube 20 is opposite in polarity to the bias on the detector 16 so that the reference current $I_{ref}$ is subtracted from the current output of the detector 16. A $10^8$ ohm resistor 22, a 100 $\mu\mu$fd. capacitor 24 and an A.-C. amplifier 32 are connected in series to the conductor 21. The amplifier 32 has high gain characteristics to reduce the effects of leakage to ground from conductor 21 and to give the desired accuracy in accordance with standard feedback amplifier techniques.

A vibrating capacitor 26 mounted on soft rubber pads to eliminate the mechanical modulation of the signal components and to isolate the ground side of the capacitor for biasing purposes, is connected to the conductor between the resistor 22 and the capacitor 24. Vibrating capacitor 26 enables A.-C. circuitry to be used for measuring the extremely small charge. The capacitor 26 has one moving part which is a heavy vibrating reed. The reed constitutes one plate of the capacitor and a stationary anvil is the other plate of the capacitor. With a charge on the capacitor 26 the variation in capacitance will produce an alternating voltage whose amplitude is proportional to the charge. An amplifier zero balance circuit is connected to the vibrating capacitor 26. This circuit includes a 100 ohm potentiometer 28 having a control 30. The control 30 is operable to provide the potentiometer with a positive or negative bias.

A $10^8$ ohm grounded resistor 34 is connected to the conductor between the capacitor 24 and the A.-C. amplifier 32. The resistor 34 supplies a ground path for the input of amplifier 32. The resistor 22 isolates the capacitor 26 from capacitance of conductor 21. The resistance of each resistor 22 and 34 must be considerably higher than the impedance of capacitor 26. The impedance of capacitor 24 must be smaller than the impedance of resistor 34. The stray capacity which includes the input capacity of amplifier 32 must be appreciably higher than the capacitance of capacitor 26.

A phase sensitive rectifier 35 is connected to the output conductor of the A.-C. amplifier 32. The modulation of the A.-C. output of the amplifier 32 is synchronized with the vibrations of the vibrating reed capacitor 26. The synchronous control 36 connected to the vibrating capacitor 26 and the phase sensitive rectifier 35 synchronizes these components. The rectifier 35 is conductively connected to the circuit output terminal 37.

A feedback conductor 38 connected to the output terminal 37 and the detector conductor 21 shunts the output signals back to the input conductor of the amplifier circuit. The feedback includes a first resistor 39 (500 ohm) in series with a second high megohm ($10^{10}$ ohm) resistor 40. A level adjustment circuit comprising a resistor 42 (1000 ohm) and a potentiometer 44 (100 ohm) connected in series is positioned in the feedback at a point 43 between the resistors 39 and 40. Potentiometer 44 contains a biasing control 46 operable to provide the potentiometer with a positive or negative voltage. The output caused by the bias on the potentiometer 44 depends upon the resistance of resistors 42 and 39. This bias is given a preprogrammed change to compensate for the changes in intensity of the radioisotope source used in the densitometer 10. The terminal 43 provides the convenient input point for an auxiliary input to compensate for other adverse conditions, such as temperature. The resistor 39, the resistor 42, and the resistor for the potentiometer 44 are of conventional size, wire wound and have high precision.

The level adjusting and amplification circuit receives both the steady-state component and the variable component of the current from the detector 16. A reference current $I_{ref}$ from the tube 20 on the same order of magnitude as the steady-state current $I_{ss}$ from the detector 16 balances out most of said steady-state current. The circuit does not depend primarily upon the stability of a high megohm resistor to balance out the steady-state current. Thee vibrating reed capacitor 26 is charged by the flow of the variable current component $I_v$ through the resistance 22 and the flow of current through resistor 22 caused by any error voltage to ground which may exist in conductor 21. The vibrating capacitor 26 produces an alternating voltage whose amplitude is proportional to the charge thereon. The amplifier D.-C. grid current is blocked by the coupling capacitor 24 to prevent this current from charging the vibrating capacitor 26 with attendant error. Capacitor 24 passes the alternating current voltage from vibrating capacitor 26 to the input of amplifier 32, as is desired. The stabilized A.-C. amplifier 32 amplifies the alternating signal. The phase sensitive rectifier 35 driven in synchronism with the vibrating capacitor 26 changes the alternating current to direct current. This D.-C. signal is a function of the density of the process material flowing in the conduit 18. This signal is used to control the density of the process material.

The only current flowing through feedback resistor 40 is the variable component of the detector 16 current $I_v$ plus the small portion of the steady-state current $I_{ss}$ which has not been balanced out by $I_{ref}$ from the low current reference tube 20. Potentiometer 44 is used to cancel the effect upon the output voltage at 37 of this small remaining portion of the steady-state current $I_{ss}$. Potentiometer 44 is changed periodically to compensate for changes in the intensity of the decaying radioisotope material of the radioactive source 14.

Figure 2:
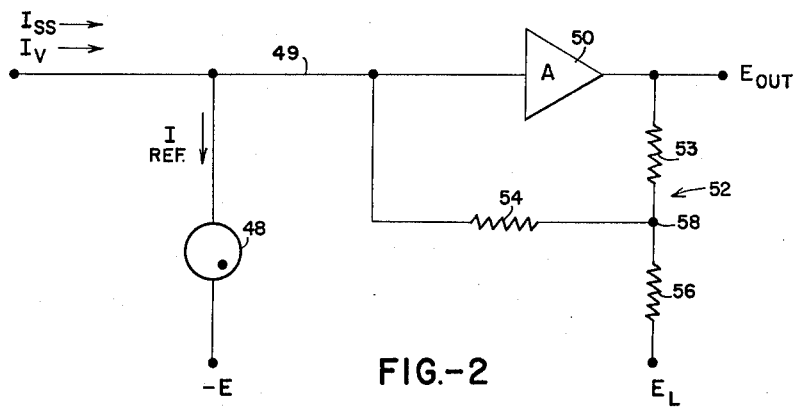
FIG. 2 is a circuit digram of a modified level adjusting circuit for a densitometer amplifier.

The modified level adjusting and amplification circuit shown in FIG. 2 contains a component 48 having a steady current output and a negative bias connected to a conductor 49 to balance out the steady-state current from the detector. The bias is of a polarity such that the reference current $I_{ref}$ is subtracted from the steady-state current $I_{ss}$. The variable signal from the detector is amplified by an amplifier 50. A feedback means 52 shunts the amplifier to send the amplifier output back to the amplifier input. Feedback means includes a first conventional wire wound resistor 53 in series with a second high megohm ($10^{10}$ ohm) resistor 54. A leveling bias $E_L$ is conncted to the feedback means by a resistor 56 at a point 58 between the resistor 53 and the resistor 54. The leveling bias is adjustable to compensate for changes in the current and differences between the constant low current and the steady rate current.

The amplifier circuits described have utility in any case where low currents are to be measured. They are particularly suitable where the current is made up of a large steady-state or average component and a small variable component. The small current component can be determined with a high degree of accuracy.

Where there have been shown, described, and pointed out the fundamental novel features of the invention as applied to the preferred embodiment, it will be un-

What is claimed is:

1. In combination,
a gamma-ray densitometer including
a radioactive source and a radioactivity detection means responsive to gamma rays to produce a low current source,
a circuit for balancing out the steady-state current and amplifying the variable signal of said low current source comprising
 reference means having a constant current output and a bias opposed to the polarity of the detector current,
 a first conductor connected to said source and said means,
 a resistor, a coupling capacitor, and high gain A.-C. amplifier connected in series to said conductor operative to amplify the variable signal component of said source,
 an input resistor connected to the conductor between the coupling capacitor and the amplifier to supply a ground path for the amplifier,
 a vibrating reed capacitor connected to the conductor between the first said resistor and the capacitor operative to produce an alternating signal whose amplitude is proportional to the charge on the reed capacitor,
 phase sensitive rectifying means connected to the output of said A.-C. amplifier and the output terminal of the circuit,
 means synchronizing the phase characteristics of the vibrating reed capacitor and the rectifying means,
 feedback means connected to the circuit output terminal and the first conductor,
 said feedback means including a first resistor in series with a second high megohm resistor, and
adjustable biasing means connected to said feedback means between said resistors to compensate for differences between the constant current and the steady-state current.

2. In combination,
a gamma-ray densitometer including a radioactive source and a radioactivity detection means responsive to gamma rays to produce a low current source,
a circuit for balancing out the steady-state current and amplifying the variable signal of said low current source comprising
 a conductor carrying the steady-state and variable signal from said source,
 means connected to said conductor having a constant low current output of substantially the same order of magnitude as the steady-state current to balance out most of the steady-state current of said source,
 a high gain A.-C. amplifier connected to said conductor to amplify the variable signal component of said source,
 a vibrating capacitor connected to said conductor between low current output means and the A.-C. amplifier operative to produce an alternating signal whose amplitude is proportional to the charge on the capacitor,
 a phase sensitive rectifying means connected to the output of said A.-C. amplifier, and
 means synchronizing the phase characteristics of the vibrating capacitor and rectifying means.

3. In combination,
a densitometer including a radioactive source and a radioactivity detector response to the energy rays of said source to produce a low current source,
a circuit for balancing out the steady-state current and amplifying the variable signal of said low current source comprising
 a conductor carrying the steady-state and variable signal from said source,
 means connected to said conductor having a constant low current output of substantially the same order of magnitude as the steady-state current to balance out most of the steady-state current of said source,
 a resistor, a coupling capacitor, and a high gain A.-C. amplifier connected in series to amplify the variable signal component of said source,
 an input resistor connected to the conductor between the coupling capacitor and the amplifier to supply a ground path for the amplifier,
 a vibrating reed capacitor connected to the conductor between the resistor and the capacitor operative to produce an alternating signal whose amplitude is proportional to the charge on the reed capacitor,
 a phase sensitive rectifying means connected to the output of said A.-C. amplifier, and
 means synchronizing the phase characteristics of the vibrating reed capacitor and the rectifying means.

4. A circuit for balancing out the steady-state current and amplifying the variable signal of a low current source comprising
 reference means having a constant current output and a bias opposed to the polarity of the low current source,
 a first conductor connected to said source and said means,
 a resistor, a capacitor and a high gain A.-C. amplifier connected in series to said conductor operative to amplify the variable signal component of said source,
 a vibrating reed capacitor connected to the conductor between the resistor and the capacitor operative to produce an alternating signal whose amplitude is proportional to the charge on the reed capacitor,
 phase sensitive rectifying means connected to the output of said A.-C. amplifier and the output terminal of the circuit,
 means synchronizing the phase characteristics of the vibrating reed capacitor and the rectifying means,
 feedback means connected to the circuit output terminal and the first conductor,
  said feedback means including a first resistor in series with a second high megohm resistor, and adjustably biasing means connected to said feedback
means between said resistors to compensate for differences between the constant current and the steady-state current.

5. In a circuit for balancing out the steady state current and amplifying the variable signal component of a low current source,
 a conductor carrying the steady-state and variable signal from said source,
 means connected to said conductor having a constant low current output of substantially the same order of magnitude as the steady-state current to balance out the steady-state current of said source,
 a resistor, a capacitor, and an A.-C. amplifier connected in series to amplify the variable signal component of said source,
 a vibrating reed capacitor connected to the conductor between the resistor and the capacitor operative to produce an alternating signal whose amplitude is proportional to the charge on the reed capacitor,
 a phase sensitive rectifying means connected to the output of said A.-C. amplifier, and means synchronizing the phase characteristics of the vibrating reed capacitor and the rectifying means.

6. A circuit for balancing out the steady-state current and amplifying the variable signal component of a low current source,
- a conductor carrying the steady-state and variable signal from said source,
- means connected to said conductor having a constant low current output of substantially the same order of magnitude as the steady-state current to balance out most of the steady-state current of said source,
- an A.-C. amplifier connected to said conductor to amplify the variable signal component of said source,
- a vibrating capacitor connected to said conductor between low current output means and the A.-C. amplifier operative to produce an alternating signal whose amplitude is proportional to the charge on the capacitor,
- a phase sensitive rectifying means connected to the output of said A.-C. amplifier, and
- means synchronizing the phase characteristics of the vibrating capacitor and rectifying means.

References Cited by the Examiner

UNITED STATES PATENTS

| | | | |
|---|---|---|---|
| 2,534,352 | 12/50 | Herzog | 250—83.3 |
| 2,819,408 | 1/58 | Swift | 250—83 |
| 2,965,847 | 12/60 | Radley | 250—85.3 |

FOREIGN PATENTS 817,371  7/59  Great Britain.

RALPH G. NILSON, *Primary Examiner.*

ARCHIE R. BORCHELT, JAMES W. LAWRENCE, *Examiners.*